United States Patent
Park

(10) Patent No.: US 7,673,619 B2
(45) Date of Patent: Mar. 9, 2010

(54) GAS VAPOR CONTROL SYSTEM AND METHOD THEREOF

(75) Inventor: Yong-Jung Park, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 12/269,664

(22) Filed: Nov. 12, 2008

(65) Prior Publication Data

US 2009/0277426 A1    Nov. 12, 2009

(30) Foreign Application Priority Data

May 7, 2008    (KR) .................. 10-2008-0042536

(51) Int. Cl.
  F02M 33/02    (2006.01)
  G06F 19/00    (2006.01)
  F02D 41/00    (2006.01)
(52) U.S. Cl. ............... 123/520; 123/698; 701/103; 701/113
(58) Field of Classification Search .......... 123/516, 123/518–520, 698; 701/103, 104, 112, 113
See application file for complete search history.

(56) References Cited

U.S. PATENT DOCUMENTS

| | | | |
|---|---|---|---|
| 6,119,662 A * | 9/2000 | Duty et al. ............ | 123/520 |
| 7,347,194 B2 * | 3/2008 | Sato ...................... | 123/520 |
| 7,464,698 B2 * | 12/2008 | Maegawa ............... | 123/519 |
| 7,565,900 B2 * | 7/2009 | Sato et al. .............. | 123/516 |
| 2003/0005915 A1 * | 1/2003 | Mitsutani .............. | 123/674 |
| 2008/0092858 A1 * | 4/2008 | Satoh et al. ........... | 123/520 |
| 2008/0120019 A1 * | 5/2008 | Inoue et al. ............ | 701/113 |

FOREIGN PATENT DOCUMENTS

| | | |
|---|---|---|
| JP | 09-014063 A | 1/1997 |
| JP | 2001-003820 A | 1/2001 |

* cited by examiner

*Primary Examiner*—Thomas N Moulis
(74) *Attorney, Agent, or Firm*—Morgan, Lewis & Bockius LLP

(57) ABSTRACT

A gas vapor control system may include a canister for capturing gas vapor that is generated from a fuel, a throttle valve that is disposed substantially in the middle of an intake passage through which air flows into a cylinder of the engine, a gas passage that communicates from the canister to one side downstream of the throttle valve, a purge control valve that is disposed on the gas passage, and a control portion that stops an engine in an idle state and controls a real fuel injection amount that is to be injected while restarting the engine according to a first fuel amount that is included in gas vapor that is discharged into the intake passage.

20 Claims, 2 Drawing Sheets

GAS VAPOR CONTROL SYSTEM AND METHOD THEREOF

CROSS-REFERENCE TO RELATED APPLICATION

The present application claims priority to Korean Patent Application No. 10-2008-0042536 filed on May 7, 2008, the entire contents of which is incorporated herein for all purposes by this reference.

BACKGROUND OF THE INVENTION

1. Field of the Invention

The present invention relates to a gas vapor control system, and more particularly to a gas vapor control system and a method for reducing fuel consumption and improving purification efficiency of a catalyst.

2. Description of Related Art

Generally, main pollution materials that are included in exhaust gas are hydrocarbon, carbon monoxide, and nitrogen oxide, and a catalyst apparatus is used to reduce such pollution materials.

The catalyst apparatus oxidizes or reduces the pollution materials that are included in the exhaust gas and transforms the pollution materials to harmless nitrogen, carbon dioxide, and moisture. However, the catalyst apparatus has a characteristic that accumulates oxides when the oxides are larger than a predetermined value during an oxidation/reduction reaction.

When the engine comes to a stop for a long time, the catalyst apparatus is exposed to oxides of the atmosphere and oxygen storage capability thereof decreases. Further, as the oxygen storage capability of the catalyst apparatus increases, the purification capability against nitrogen oxide decreases during the oxidation/reduction reaction.

An amount of fuel that is greater than a theoretical fuel injection amount is supplied during starting so as to solve problems such that the oxide that is captured in the catalyst apparatus is eliminated. However such a system leads to a countervailing increase in fuel consumption.

A vehicle that is equipped with an idle stop and go system stops the engine in an idle state to reduce fuel consumption. The restarting is performed without operating an ignition key in a case in which the driving will of the driver is detected.

However, while the engine repeats stopping and restarting on the idle stop and go system, the oxygen storage capability (OSC) of the catalyst apparatus decreases, and thereby there is a problem in that the purification performance relating to the nitrogen oxide and other pollutants decreases.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention have been made in an effort to provide a gas vapor control system and a method thereof having advantages of reducing fuel consumption when restarting and increasing oxygen storage capability of a catalyst apparatus to improve purification efficiency of the catalyst apparatus.

In various embodiments of the present invention, a gas vapor control system may include a canister for capturing gas vapor that is generated from a fuel, a throttle valve that is disposed substantially in the middle of an intake passage through which air flows into a cylinder of the engine, a gas passage that communicates from the canister to one side downstream of the throttle valve disposed in the intake passage, a purge control valve that is disposed on the gas passage, and/or a control portion that stops the engine in an idle state and controls a real fuel injection amount (Fr) that is to be injected into the engine while restarting the engine according to a first fuel amount (Va) that is included in gas vapor that is discharged in the intake passage from the gas passage.

The gas vapor control system may further include a catalyst that is disposed substantially in the middle of an exhaust passage through which exhaust gas passes from the cylinder of the engine. The control portion may be configured to establish a second fuel amount (Fa) that to be added to the intake passage so as to purge the catalyst when oxygen storage capability of the catalyst is less than a predetermined value. When the first fuel amount (Va) that is included in the gas vapor is larger than the calculated second fuel amount (Fa), the real fuel injection amount (Fr) that is to be injected may be a normal injection amount (Fn) minus Fs (Fs=Va−Fa). When the first fuel amount (Va) that is included in the gas vapor is less than the calculated second fuel amount (Fa) that is additionally to be added, the real fuel injection amount (Fr) may be a normal injection amount (Fn) plus Fd (Fd=Fa−Va). The oxygen storage capability may be calculated by analyzing signals that are transmitted from at least an oxygen sensor that is disposed adjacent to the catalyst. The throttle valve may be closed and the purge control valve may be opened such that the gas vapor that is included in the canister is supplied to the intake passage when the engine is in the idle state.

Various aspects of the present invention are directed to an engine including a gas vapor control system in accordance with the above. The system may include a canister for capturing gas vapor that is generated from a fuel; a throttle valve that is disposed substantially in the middle of an intake passage through which air flows into a cylinder of the engine; a gas passage that communicates from the canister to one side downstream of the throttle valve disposed in the intake passage; a purge control valve that is disposed on the gas passage, and/or a control portion that stops the engine in an idle state and controls a real fuel injection amount (Fr) that is to be injected into the engine while restarting the engine according to a first fuel amount (Va) that is included in gas vapor that is discharged in the intake passage from the gas passage. The system may further include a catalyst that is disposed substantially in the middle of an exhaust passage through which exhaust gas passes from the cylinder of the engine. The control portion may be configured to establish a second fuel amount (Fa) that is to be added to the intake passage to purge the catalyst when oxygen storage capability of the catalyst is less than a predetermined value. When the first fuel amount (Va) that is included in the gas vapor is larger than the calculated second fuel amount (Fa), the real fuel injection amount (Fr) that is to be injected may be a normal injection amount (Fn) minus Fs (Fs=Va−Fa). When the first fuel amount (Va) that is included in the gas vapor is less than the calculated second fuel amount (Fa) that is additionally to be added, the real fuel injection amount (Fr) may be a normal injection amount (Fn) plus Fd (Fd=Fa−Va). The oxygen storage capability may be calculated by analyzing signals that are transmitted from at least an oxygen sensor that is disposed adjacent to the catalyst. The throttle valve may be closed and the purge control valve may be opened such that the gas vapor that is included in the canister is supplied to the intake passage when the engine is in the idle state.

The engine comprising the gas vapor control system may further include a catalyst that is disposed substantially in the middle of an exhaust passage through which exhaust gas passes from the cylinder of the engine. The control portion may be configured to establish a second fuel amount (Fa) that is additionally to be added to the intake passage so as to purge the catalyst when an oxygen storage capability of the catalyst is less than a predetermined value. When the first fuel amount (Va) that is included in the gas vapor is larger than the calculated second fuel amount (Fa), the real fuel injection amount (Fr) that is to be injected may be a normal injection amount (Fn) minus Fs (Fs=Va−Fa). When the first fuel amount (Va) that is included in the gas vapor is less than the calculated second fuel amount (Fa) that is to be added, the real fuel injection amount (Fr) may be a normal injection amount (Fn) plus Fd (Fd=Fa−Va). The oxygen storage capability may be calculated by analyzing signals that are transmitted from at least an oxygen sensor that is disposed adjacent to the catalyst. The throttle valve may be closed and the purge control valve may be opened such that the gas vapor that is included in the canister is supplied to the intake passage when the engine is in the idle state.

In various embodiments, a gas vapor control method includes providing a canister for capturing gas vapor that is generated from a fuel, a throttle valve that is disposed substantially in the middle of an intake passage through which air flows into a cylinder of the engine, a gas passage that communicates from the canister to one side downstream of the throttle valve positioned in the intake passage, and a purge control valve that is disposed on the gas passage. The method may include stopping an engine in an idle state; closing the throttle valve and opening the purge control valve if stop of an engine in an idle state is detected; calculating a first fuel amount (Va) that is included in gas vapor that is in the intake passage in front of the throttle valve, and/or calculating a real fuel injection amount (Fr) according to the first fuel amount (Va) while restarting the engine. The gas vapor control method may further include detecting oxygen storage capability ("OSC") of a catalyst and calculating a second fuel amount (Fa) that is to be additionally added so as to purge the catalyst when the oxygen storage capability is less than a predetermined value. When the first fuel amount (Va) that is included in the gas vapor is larger than the second fuel amount (Fa) that is to be additionally added, a real fuel injection amount (Fr) that is to be injected into a cylinder of the engine may be a normal injection amount (Fn) minus Fs (Fs=Va−Fa). When the first fuel amount (Va) that is included in the gas vapor is less than the second fuel amount (Fa) that is to be additionally added, a real fuel injection amount (Fr) that is to be injected into a cylinder of the engine may be a normal injection amount Fn plus Fd (Fd=Fa−Va). The oxygen storage capability may be calculated by analyzing signals that are transmitted from an oxygen sensor that is disposed adjacent to the catalyst.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
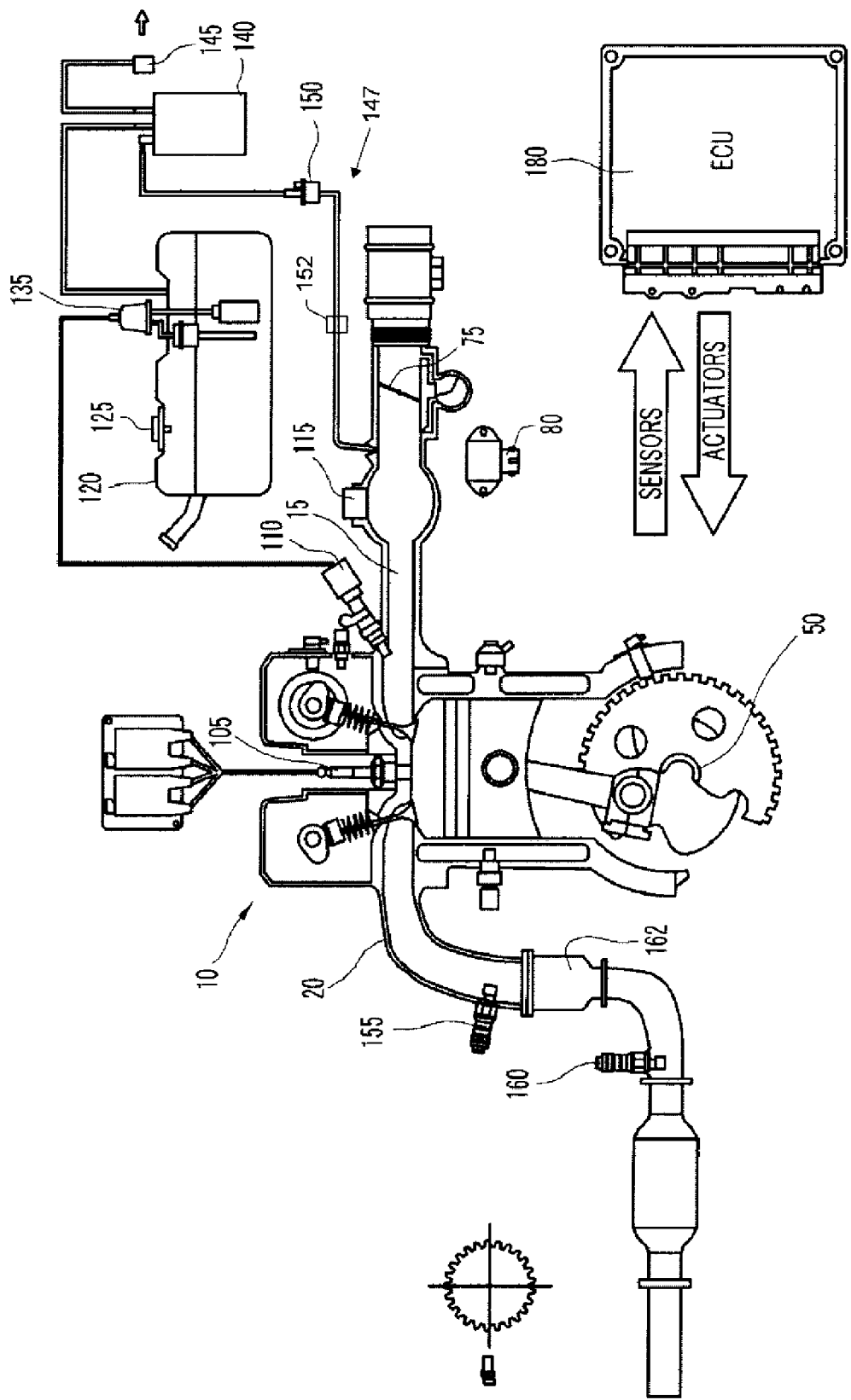
FIG. 1 is a schematic diagram of an exemplary gas vapor control system in accordance with the present invention.

FIG. 1 is a schematic diagram of a gas vapor control system according to an exemplary embodiment of the present invention.

Referring to FIG. 1, an engine 10 includes an intake passage 15, a throttle valve ("ETC", 75), a throttle opening rate sensor 80, a manifold pressure sensor 115, an injector 110, an exhaust passage 20, a crankshaft 50, a spark plug 105, a catalyst apparatus 162, and oxygen sensors 155 and 160.

Also, a fuel tank 120, a fuel pressure sensor 125, a fuel pump 135, a canister 140, a close valve 145, and a purge control valve (PCV, 150) are disposed adjacent to the engine 10. Further, a control portion 180 that includes programs for controlling the constituent elements is provided.

The throttle valve 75, the opening rate sensor 80 for detecting a position of the throttle valve 75, and the pressure sensor 115 for sensing internal pressure downstream of the throttle valve 75 are disposed in the intake passage 15.

The injector 110 for injecting fuel is disposed in the intake passage 15 and upstream of the cylinder of the engine 10. The catalyst apparatus 162 is disposed in the exhaust passage 20 downstream of the cylinder of the engine 10. The catalyst apparatus 162 transforms harmful hydrocarbon, carbon monoxide, and nitrogen oxide that are included in the exhaust gas to harmless carbon dioxide and moisture.

In various embodiments of the present invention, the oxygen sensors 155 and 160 for detecting oxygen in the exhaust gas are disposed upstream and downstream of the catalyst apparatus 162 respectively. Signals from the oxygen sensors 155 and 160 are transmitted to the control portion 180, and the control portion 180 analyzes the received signals and calculates the oxygen storage capability ("OSC") of the catalyst apparatus 162 as explained later in detail.

The fuel pump 135 for supplying fuel to the injector 110 is disposed in the fuel tank 120. The fuel pressure sensor 125 for detecting the internal pressure of the tank is further disposed in the fuel tank 120.

A gas passage 147 through which gas vapor that is evaporated from the fuel of the fuel tank 120 moves is provided. The gas passage 147 communicates with the intake passage 15 in front of the throttle valve 75. Further, the canister 140 for capturing the gas vapor evaporated from the fuel in the fuel tank 120 is disposed substantially in the middle of the gas passage 147.

The purge control valve 150 is disposed downstream of the canister 140 to control the amount of gas vapor that is to be supplied to the intake passage 15.

The purge control valve 150 is controlled by the control portion 180 and supplies the gas vapor in the canister 140 to the intake passage 15. In various embodiments, a gas vapor volume sensor 152 may be installed downstream the purge control valve 150 to measure the amount of gas vapor supplied to the intake passage 110 from the canister 140. The purge control valve 150 may also be controlled based on the gas vapor amount in the canister 140.

The close valve 145 may be closed in a normal condition such that the gas vapor does not spread into the air in normal condition but the close valve 145 is opened in an abnormal condition.

The idle stop and go system and its operation method are optionally performed to reduce fuel consumption. Particularly, the engine 10 is stopped in an idle state by the control portion 180. When the driving will of the driver is detected, the engine is restarted without operation of an ignition key.

While the engine 10 repeats stopping and restarting in the idle stop and go system, the oxygen storage capability ("OSC") of the catalyst apparatus 162 may be decreased, and thereby the purification capability against the nitrogen oxide may be decreased.

A fuel amount that is larger than a normal injection amount is injected through the injector 110 during restarting of the engine 10 so as to resolve the above and other problems. For example, the above apparatus and method may improve the oxygen storage capability of the catalyst apparatus 162. As described herein, the word "purge" means enhancing the oxygen storage capability of the catalyst apparatus by supplying additional fuel.

Particularly, when restarting the engine 10 in a case in which the engine 10 is stopped, the fuel injection amount is varied according to the fuel amount that is included in the gas vapor that is supplied through the purge control valve 150 to the intake passage 15.

If more fuel in the gas vapor is supplied into the intake passage 15 through the purge control valve 150 than desired, a small amount of fuel may be injected when restarting; whereas if less fuel in the gas vapor is supplied in the intake passage 15, a greater amount of fuel is injected when restarting.

When the engine 10 stops in the idle state, the throttle valve 75 is closed and the purge control valve 150 is opened so that the gas vapor in the canister 140 is supplied into the intake passage 15 through the purge control valve 150. The amount of gas vapor supplied to the intake passage 110 from the canister 140 may be measured by the gas vapor volume sensor 152.

Also, the oxygen storage capability (OSC) of the catalyst apparatus 162 is calculated based on the signals that are transmitted from the oxygen sensor 155 and 160, and the fuel amount that is to be added is determined based on the calculated data.

The control portion 180 closes the throttle valve 75, opens the purge control valve 150 in the idle state, and calculates a theoretical fuel injection amount that is to be charged in the intake passage 15 in accordance with the oxygen storage capability ("OSC") of the catalyst apparatus 162 in the idle stop condition.

Further, the control portion 180 adjusts the fuel amount that is to be injected through the injector 110 when restarting according to the measured fuel amount that is included in the gas vapor of the intake passage 15 and the calculated theoretical fuel injection amount that is to be charged in the intake passage 15.

Generally, when a vehicle speed is lower than 3 km/h, when the engine thereof is in the idle state, when the gear state thereof is neutral, and/or when the clutch thereof is released, the idle stop and go function is operated normally.

Further, when an operating switch is off, when a SOC value of a battery is lower than a set value, when a safety belt is not put on, when a door is open, when hydraulic pressure of a brake is low, and/or when related sensors and switches are disabled, the idle stop and go function is not operated.

The case in which the engine 10 is restarted in the idle stop condition includes when a clutch is pressed in the normal condition, when a vehicle speed is higher than 10 km/h and a gear is neutral, and/or when hydraulic pressure of a brake is low.

In various embodiments of the present invention, in the idle stop and go system, a crank sensor may be disposed so as to reduce the restarting time, and a battery sensor is disposed and configured so as to detect the charging condition (SOC) and performance of a battery. In addition, an operating switch that is operated by a driver may be disposed. A display portion that provides notification signal related to the operating condition of the idle stop and go system may be disposed in a cluster.

Also, a neutral switch for detecting a neutral position of a gear and a position switch for detecting a position of a clutch pedal may be disposed. The AGM battery may be prepared to improve durability thereof. Further, it may be desirable that a starter and a generator are improved to be durable.

Figure 2:
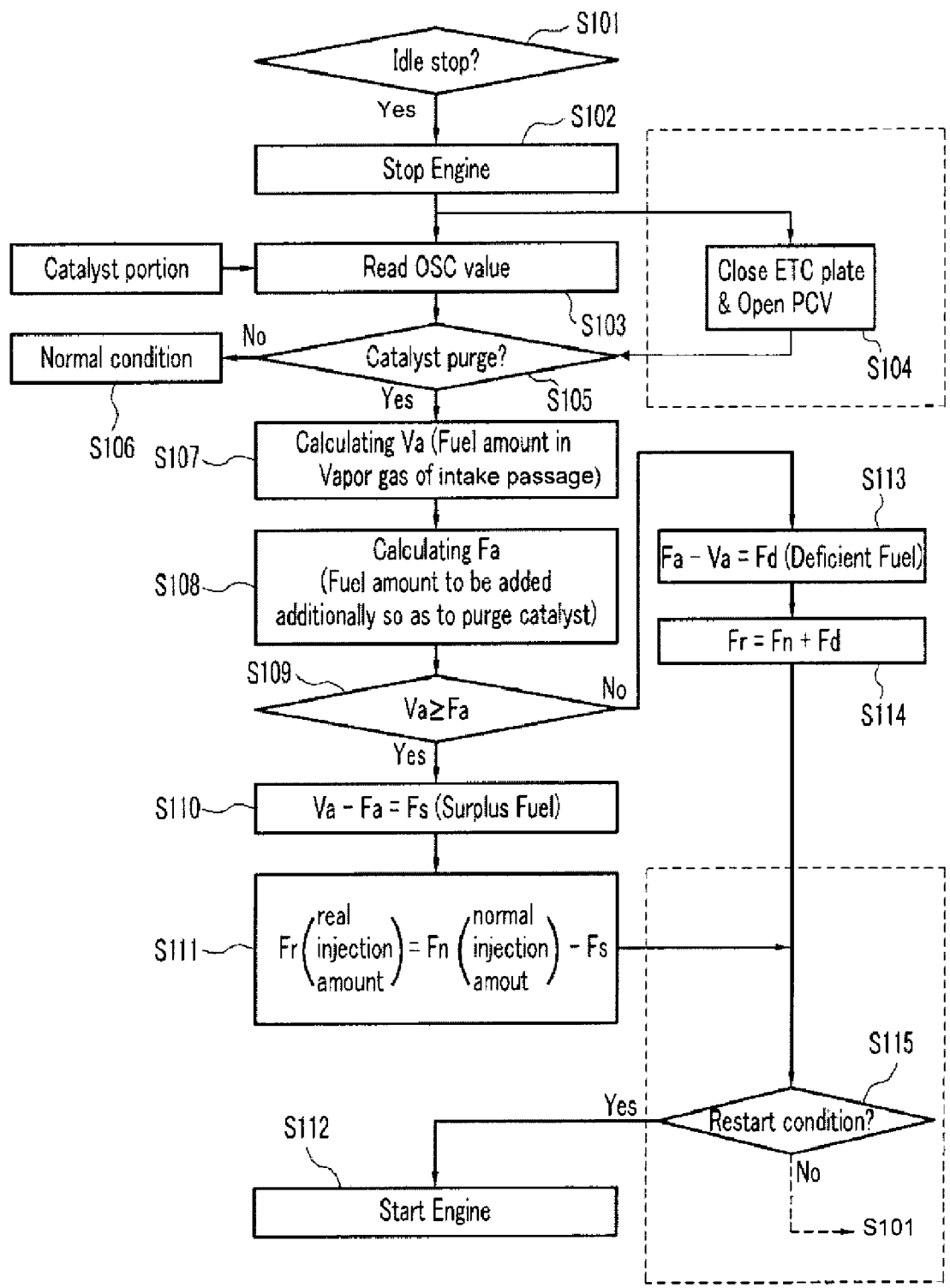
FIG. 2 is a flowchart showing an exemplary gas vapor control method in accordance with the present invention.

A method of controlling gas vapor in accordance with the present invention will now be described. FIG. 2 is an exemplary flowchart showing a gas vapor control method according to various embodiments of the present invention.

Referring to FIG. 2, in a first step S101, control portion 180 determines whether the idle stop in engine 10 is active or not. As would be understood by one skilled in the art, a conventional idle system may be provided in conjunction with the system of the present invention, and as such, a detailed description of the idle system will be omitted.

In a second step S102, control portion 180 stops the engine 10 when the idle stop in the engine 10 is active. In a third step S103, the control portion 180 calculates the oxygen storage capability of a catalyst in the catalyst apparatus 162 based on the signals that are transmitted from the oxygen sensor 155 and 160 of FIG. 1.

After the second step S102, the third step S103 and a fourth step S104 are substantially simultaneously executed. Thus, the throttle valve 75 is closed and the purge control valve 150 is opened in the fourth step S104 so as to supply the gas vapor from the canister 140.

In a fifth step S105, the control portion 180 determines whether the catalyst is to be purged or not according to the oxygen storage capability ("OSC") of the catalyst apparatus 162.

If the control portion 180 concludes that the oxygen storage capability ("OSC") is higher than a predetermined value, the engine 10 is normally operated in a sixth step S106.

If the control portion 180 concludes that the oxygen storage capability ("OSC") is lower than a predetermined value, a first fuel amount Va that is included in gas vapor in the intake passage 15 is calculated based on received signals of the gas vapor volume sensor 152 in a seventh step S107.

A second fuel amount Fa that is to be additionally injected into the intake passage 15, theoretically so as to purge a catalyst apparatus 162, is calculated referring to the measured oxygen storage capability in an eighth step S108.

The first fuel amount Va and the second fuel amount Fa are compared in a ninth step S109. When the first fuel amount Va is larger than or equal to the second fuel amount Fa, a third fuel amount Fs, that is, a difference value of the first fuel amount Va and the second fuel amount Fa, is calculated in a tenth step S110.

Also, a fourth fuel amount Fr that is to be actually injected through the injector 110 is calculated in an eleventh step S111, the fourth fuel amount Fr being a fifth fuel amount Fn, which is injected in a normal restarting condition, minus the third fuel amount Fs. When the restarting condition is satisfied in a fifteenth step S115, the engine is restarted in the twelfth step S112, wherein the fourth fuel amount Fr that is calculated in the eleventh step S111 is actually injected.

When the first fuel amount Va is smaller than the second fuel amount Fa in the ninth step S109, a thirteenth step S113 is executed. That is, the difference between the second fuel amount Fa and the first fuel amount Va in the thirteenth step S113 is a sixth fuel amount Fd that is insufficient.

The fourth fuel amount Fr that is to be actually injected in a fourteenth step S114 is the fifth fuel amount Fn plus the sixth fuel amount Fd. Further, as described above, when the restarting condition is satisfied in the fifteenth step S115, the engine is restarted in the sixteenth step S116.

Fuel that is to be injected through the injector 110 may be reduced when restarting the engine according to the fuel amount that is included in the gas vapor of the intake passage 15.

Also, the purge is performed according to the oxygen storage capability of the catalyst apparatus 162 such that the oxygen storage capability of the catalyst apparatus may be effectively improved and the nitrogen oxide may be effectively purified. One skilled in the art will appreciate from the foregoing that the steps described above may be modified, omitted, or provided in various sequences in accordance with the present invention.

For convenience in explanation and accurate definition in the appended claims, the terms "lower", "front", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gas vapor control system, comprising:
    a canister for capturing gas vapor that is generated from a fuel;
    a throttle valve that is disposed substantially in the middle of an intake passage through which air flows into a cylinder of the engine;
    a gas passage that communicates from the canister to one side downstream of the throttle valve disposed in the intake passage;
    a purge control valve disposed on the gas passage; and
    a control portion configured to stop the engine in an idle state and control a real fuel injection amount (Fr) that is to be injected into the engine while restarting the engine according to a first fuel amount (Va) that is included in gas vapor that is discharged in the intake passage from the gas passage.

2. The gas vapor control system of claim 1, further comprising a catalyst that is disposed substantially in the middle of an exhaust passage through which exhaust gas passes from the cylinder of the engine, wherein the control portion is configured to establish a second fuel amount (Fa) to be added to the intake passage so as to purge the catalyst when oxygen storage capability of the catalyst is less than a predetermined value.

3. The gas vapor control system of claim 2, wherein when the first fuel amount (Va) that is included in the gas vapor is larger than the established second fuel amount (Fa), the real fuel injection amount (Fr) that is to be injected is a normal injection amount (Fn) minus Fs (Fs=Va−Fa).

4. The gas vapor control system of claim 2, wherein when the first fuel amount (Va) that is included in the gas vapor is less than the established second fuel amount (Fa) to be added, and the real fuel injection amount (Fr) is a normal injection amount (Fn) plus Fd (Fd=Fa−Va).

5. The gas vapor control system of claim 2, wherein the oxygen storage capability is calculated based on signals that are transmitted from at least an oxygen sensor that is disposed adjacent to the catalyst.

6. The gas vapor control system of claim 1, wherein the throttle valve is closed and the purge control valve is opened such that the gas vapor that is included in the canister is supplied to the intake passage when the engine is in the idle state.

7. An engine comprising the gas vapor control system of claim 1, further comprising a catalyst that is disposed substantially in the middle of an exhaust passage through which exhaust gas passes from the cylinder of the engine, wherein the control portion is configured to establish a second fuel amount (Fa) that is additionally to be added to the intake passage so as to purge the catalyst when oxygen storage capability of the catalyst is less than a predetermined value.

8. The engine comprising the gas vapor control system of claim 7, wherein when the first fuel amount (Va) that is included in the gas vapor is larger than the calculated second fuel amount (Fa), the real fuel injection amount (Fr) that is to be injected is a normal injection amount (Fn) minus Fs (Fs=Va−Fa).

9. The engine comprising the gas vapor control system of claim 7, wherein when the first fuel amount (Va) that is included in the gas vapor is less than the calculated second fuel amount (Fa) that is additionally to be added, the real fuel injection amount (Fr) is a normal injection amount (Fn) plus Fd (Fd=Fa−Va).

10. The engine comprising the gas vapor control system of claim 7, wherein the oxygen storage capability is calculated based on signals that are transmitted from at least an oxygen sensor that is disposed adjacent to the catalyst.

11. The engine comprising the gas vapor control system of claim 7, wherein the throttle valve is closed and the purge control valve is opened such that the gas vapor that is included in the canister is supplied to the intake passage when the engine is in the idle state.

12. An engine comprising the gas vapor control system of claim 1, further comprising a catalyst that is disposed substantially in the middle of an exhaust passage through which exhaust gas passes from the cylinder of the engine, wherein the control portion is configured to establish a second fuel amount (Fa) to be added to the intake passage so as to purge the catalyst when oxygen storage capability of the catalyst is less than a predetermined value.

13. The engine comprising the gas vapor control system of claim 12, wherein when the first fuel amount (Va) that is included in the gas vapor is larger than the established second fuel amount (Fa), the real fuel injection amount (Fr) that is to be injected is a normal injection amount (Fn) minus Fs (Fs=Va−Fa) and when the first fuel amount (Va) that is included in the gas vapor is less than the calculated second fuel amount (Fa) that is additionally to be added, the real fuel injection amount (Fr) is a normal injection amount (Fn) plus Fd (Fd=Fa−Va).

14. The engine comprising the gas vapor control system of claim 12, wherein the oxygen storage capability is calculated based on signals that are transmitted from at least an oxygen sensor that is disposed adjacent to the catalyst.

15. The engine comprising the gas vapor control system of claim 12, wherein the throttle valve is closed and the purge control valve is opened such that the gas vapor that is included in the canister is supplied to the intake passage when the engine is in the idle state.

16. A gas vapor control method that includes a canister for capturing gas vapor that is generated from a fuel, a throttle valve that is disposed substantially in the middle of an intake passage through which air flows into a cylinder of the engine, a gas passage that communicates from the canister to one side downstream of the throttle valve positioned in the intake passage, and a purge control valve that is disposed on the gas passage, the method comprising:
  stopping an engine in an idle state;
  closing the throttle valve and opening the purge control valve if stop of an engine in an idle state is detected;
  calculating a first fuel amount (Va) that is included in gas vapor that is in the intake passage in front of the throttle valve; and
  calculating a real fuel injection amount (Fr) according to the first fuel amount (Va) while restarting the engine.

17. The gas vapor control method of claim 16, further comprising
  detecting oxygen storage capability ("OSC") of a catalyst; and
  calculating a second fuel amount (Fa) to be added so as to purge the catalyst when the oxygen storage capability is less than a predetermined value.

18. The gas vapor control method of claim 16, wherein when the first fuel amount (Va) that is included in the gas vapor is larger than the second fuel amount (Fa) that is to be additionally added, a real fuel injection amount (Fr) that is to be injected into a cylinder of the engine is a normal injection amount (Fn) minus Fs (Fs=Va−Fa).

19. The gas vapor control method of claim 16, wherein when the first fuel amount (Va) that is included in the gas vapor is less than the second fuel amount (Fa) that is to be additionally added, a real fuel injection amount (Fr) that is to be injected into a cylinder of the engine 10 is a normal injection amount Fn plus Fd (Fd=Fa−Va).

20. The gas vapor control method of claim 17, wherein the oxygen storage capability is calculated based on signals that are transmitted from an oxygen sensor that is disposed adjacent to the catalyst.

* * * * *